B. J. STEEN AND O. DUDA.
WRENCH.
APPLICATION FILED JAN. 15, 1921.

1,412,143.

Patented Apr. 11, 1922.
2 SHEETS—SHEET 1.

Inventor:
Burford J. Steen
by Oswald Duda

Spear, Middleton, Donaldson & Hall
Attorneys

B. J. STEEN AND O. DUDA.
WRENCH.
APPLICATION FILED JAN. 15, 1921.

1,412,143.

Patented Apr. 11, 1922.
2 SHEETS—SHEET 2.

Inventor:
Burford J. Steen
Oswald Duda
by Spear, Middleton, Donaldson & Hall
Attorneys

UNITED STATES PATENT OFFICE.

BUFORD J. STEEN, OF CHRISTINE, AND OSWALD DUDA, OF SOUTH HOUSTON, TEXAS, ASSIGNORS TO C. E. REED, OF HOUSTON, TEXAS.

WRENCH.

1,412,143.      Specification of Letters Patent.      Patented Apr. 11, 1922.

Application filed January 15, 1921. Serial No. 437,532.

*To all whom it may concern:*

Be it known that we, BUFORD J. STEEN and OSWALD DUDA, citizens of the United States, and residents of Christine, Texas, and South Houston, Texas, respectively, have invented certain new and useful Improvements in Wrenches, of which the following is a specification.

One object of our invention is to provide a wrench of simple construction which may be readily applied to the pipe or other object to be turned and will present a rugged construction, suitable for doing heavy work, such as is necessary in connection with deep well drilling operations, where drill stem pipes must be connected and disconnected.

The invention is shown in the accompanying drawings in which,

Fig. 2 is an edge view of the head of the wrench.

Figure 1:
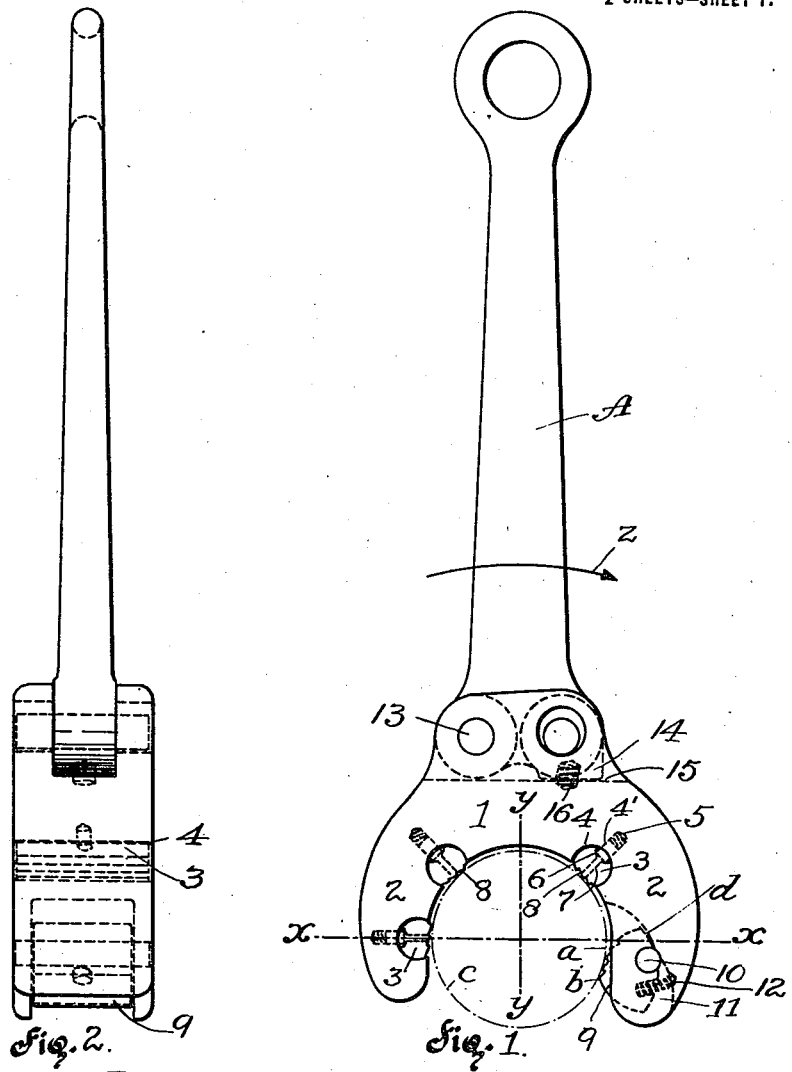
Figure 1 is a side view of the wrench.
Figure 3:
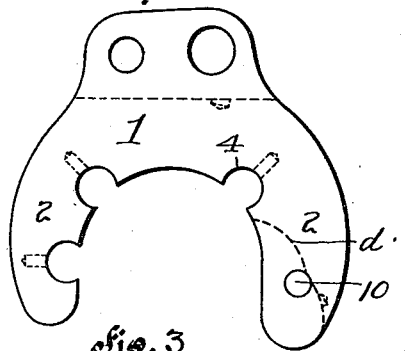
Fig. 3 is a side view with the grips omitted.
Figure 8:
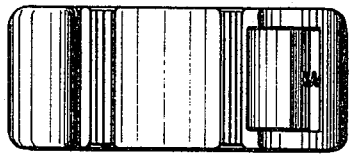
Fig. 8 is an end view of the wrench.
Figure 7:
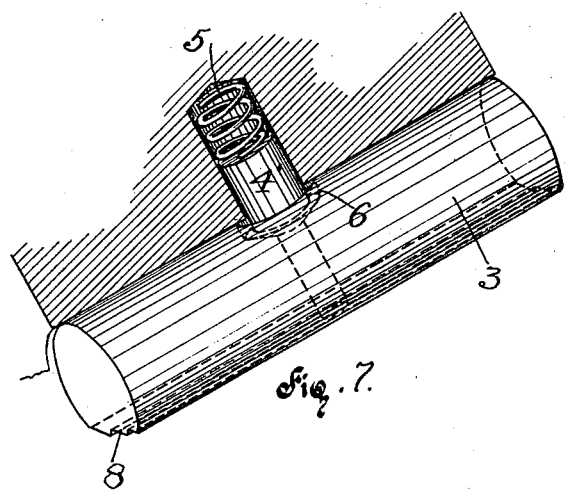
Figure 4:
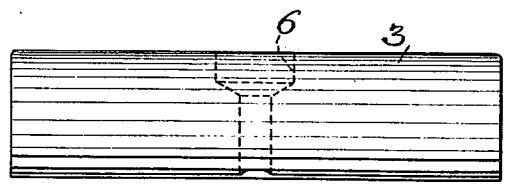
Fig. 4 is a side view of one of the gripping members.
Figure 6:
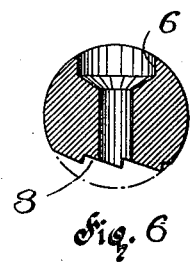
Figure 5:
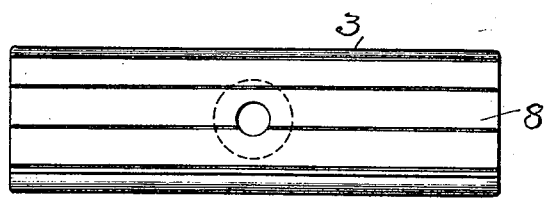
Fig. 5 is a face view, Fig. 6 a sectional view, and Fig. 7 a perspective view of one of the jaws.

In these drawings 1 indicates the head of the wrench, the jaws of which provide between them a partly circular recess for receiving the article to be turned. These jaws, indicated at 2, are provided with grips 3 which are seated in partly circular recesses 4 formed in the jaws and extending through from one side to the other side thereof. The grips are slipped into place by thrusting them laterally into these recesses, and they are held in place by spring pressed plungers 4' pressed by springs 5, the said plungers engaging pockets 6 formed in the cylindrical side faces of the grips. The grips are provided with openings 7 extending diametrically thereof, and in order to remove either one of the grips an instrument may be introduced through the opening 7 and the plunger 4 pressed back against the pressure of the spring 5, whereupon the gripping member may be thrust out laterally from the jaw.

The working face of each grip is provided with a series of teeth 8 to engage the pipe or other object to be turned. There may be any suitable number of these grips. We have shown, however, one located centrally in line with a transverse diametrical line of the jaw indicated at $x$—$x$, and there are two other fixed gripping members disposed equi-distant on each side of the central longitudinal axis $y$—$y$ of the head. All of these grips have their teeth facing in the same direction and can oscillate slightly.

At 9 we show a movable gripping member which is pivotally mounted at 10 within a recess 11 of one of the jaws of the head, this gripping member being pressed by a spring 12 outwardly at its upper portion. The gripping face of this member inclines or curves inwardly in respect to the jaw from the point $a$ to the point $b$. This gripping face extends from about the point where the transverse diameter $x$—$x$ crosses the jaw which carries this grip.

In applying force to the wrench to turn the pipe or other object, the handle A is pressed in the arrow direction, shown at $z$, and this will cause the grips to engage and turn the object or pipe. This handle member may be arranged in various ways, but in the particular construction shown, it is pivoted at 13 and has a laterally extending portion 14 adapted to deliver a hammer blow upon the surface 15 and thus turn the head of the wrench. A spring at 16 tends to force the handle into the position shown in Fig. 1.

In placing the wrench upon the object, the jaws of the head are placed to straddle the object partially, and then by turning the wrench in a direction opposite to the arrow $z$, the grips will yield by engagement with the surface of the object, and the pipe or other object then can be made to assume the position indicated in dotted lines at $c$, whereupon it will be ready to be turned by moving the wrench handle in the direction of the arrow $z$.

When the wrench has been adjusted to the object, the movable grip will engage that portion thereof which lies beyond the transverse diameter of the head, and on the opposite side the object will be engaged by the relatively fixed grip lying in the transverse diametrical line of the head.

This combination of parts, involving the fixed grip on one of the jaws and the pivoted grip on the opposite jaw and in the relation shown overhanging the space within the head, contributes to the ready placing of the wrench on the article by giving it the reverse movement mentioned, and yet when in place the grip will engage more than one-half of the article.

The fixed grips can be pushed from the head by pressure exerted on either end, the socket being open at each end through the side faces of the head.

The pivoted grip, when the wrench is turned to rotate the article, finds a bearing against the wall $d$ of the recess within which it is mounted.

The sockets or recesses 4 communicate with the space between the jaws through a contracted mouth, as shown, this structure presenting walls which extend about the grips far enough to hold them in place.

We claim:

1. A wrench having jaws with a relatively fixed grip in one jaw and a pivoted grip in the other jaw, said fixed grip lying in the transverse diameter of the jaw opening, and the pivoted grip having its gripping face extending beyond the said transverse diameter and spring pressed inwardly, said pivoted grip engaging and turning the object when the wrench is turned forwardly and yielding automatically and outwardly from the center of the space between the jaws when contacting with the object and upon backward turning of the wrench said grip having a portion in rear of its pivot to bear on the jaw, substantially as described.

2. A wrench having jaws with a relatively fixed grip in one jaw and a pivoted grip in the other jaw, said fixed grip lying in the transverse diameter of the jaw opening, and the pivoted grip having its gripping face extending beyond the said transverse diameter and the gripping face of the fixed grip and spring pressed inwardly, in respect to said opening at its outer end, and normally presenting a gripping face inclining inwardly towards the center line of the wrench and overhanging the space within the jaw, said pivoted grip engaging and turning the object when the wrench is turned forwardly and yielding automatically and outwardly from the center of the space between the jaws when contacting with the object and upon backward turning of the wrench.

3. In combination in a wrench, a head having opposing jaws with a space between them, and a socket located in the body of one the jaws and opening through the side face of the same, and communicating with the said space between the jaws through a contracted mouth, and a grip insertible into said socket from the side face of the jaw, and means for holding the grip in place, substantially as described.

4. In combination in a wrench, a head having opposing jaws with a space between them, and having also a socket in one of the jaws opening through both faces of the jaws and communicating with the said space through a contracted mouth, and a grip insertible into said socket from the side face of the jaw, and means for holding the grip in said socket, substantially as described.

5. In combination in a wrench, a head having jaws with a space between them to receive the object, and having a socket in one of the jaws. communicating through a contracted mouth with the said space and opening out through the side face of the jaw, a spring pin in the jaw for holding the grip in the socket, said grip having an opening through it communicating with said space through the contracted mouth of the socket by which an implement may be inserted for releasing the spring pin from the grip, substantially as described.

6. In combination in a wrench, a head having jaws with a space between them, a socket of partly cylindric form in the body of one of the jaws opening through the face of the same and communicating with the space between the jaws, a grip of partly cylindrical form within said socket and having a toothed gripping face and means for holding the grip removably within the socket said grip having limited rotary movement in the socket.

7. A wrench having rigid jaws with a space between them a slightly oscillating grip a socket in one jaw in which said grip oscillates automatically by contact with the object and by back and forth movement of the wrench and a pivoted eccentric grip in the other jaw, which locks the object to be held against slipping in the jaws when pressure is applied to the handle in one direction.

8. A wrench having a slightly oscillating grip in one jaw which moves by contact with the object when the wrench is turned and a pivoted grip in the other jaw, the center of said pivot being in advance of a diametrical line through the oscillating grip and center of object held in the said wrench.

9. A wrench having rigid jaws with a space between them, and a recess in the inner face of one jaw communicating with the space between the jaws, a grip slightly turnable within the recess by contact with the object, and automatically in both directions according as the wrench is turned one way or the other, and a pivoted eccentric grip, said grips being adapted to set themselves against the object when the wrench is turned in one direction.

10. A wrench comprising fixed jaws, a pivoted grip in one jaw having a gripping surface eccentric to the pivot, and with the high part of said eccentric towards the outer end of one of the jaws to overhang the space between the fixed jaws, an oscillating grip, and means to limit the movement of the pivoted grip so that the high part of its eccentric gripping surface will not exert a crushing pressure upon the object.

11. A wrench having jaws, with a partly cylindrical socket in one of the jaws, a grip of partly cylindrical form in the socket, and having a socket in its side, and a spring pin mounted in the body of the jaw and entering said socket of the grip, which socket is larger than the pin to allow slight oscillation of said grip, said grip having teeth on its face exposed in the space between the jaws to grip the object, substantially as described.

12. A wrench having jaws, with a partly cylindrical socket in one of the jaws, a grip of partly cylindrical form in the socket, and having a socket in its side, and a spring pin mounted in the body of the jaw and entering said socket of the grip, which socket is larger than the pin to allow slight oscillation of said grip, said grip having teeth on its face exposed in the space between the jaws to grip the object, said grip having an opening extending through it from its toothed face to the socket for permitting access to said spring pin, substantially as described.

13. A wrench having a jaw with a socket therein of more than a semicircle in shape in cross section, said socket opening through the side face of the jaw and also opening into the space between the jaws, a grip in said socket held by the walls thereof and of a cross sectional shape conforming to that of the socket, said grip being slightly rotatable in said socket, substantially as described.

In testimony whereof, we affix our signatures.

BUFORD J. STEEN.
OSWALD DUDA.